UNITED STATES PATENT OFFICE 2,237,066

METHOD OF PRODUCING WATER-SOLUBLE SUBSTITUTED PHENOLS

Mark Weisberg and Preston G. Slachman, Providence, R. I., assignors to Alrose Chemical Company, Cranston, R. I., a corporation of Rhode Island No Drawing. Application September 25, 1939, Serial No. 296,496

8 Claims. (Cl. 260—512)

The present invention relates to a process for preparing high molecular weight phenolic derivatives in a water-soluble state. More particularly it relates to the process for the preparation of sulfonic acids of high molecular weight phenolic derivatives which find uses for a number of purposes such as wetting and cleaning of textiles.

In the prior art, it is known that alkylated phenols may be prepared and isolated and then sulfonated. One such patent typical of this procedure is U. S. #2,133,282. The condensation of the alkyl compound with the aromatic compound is effected in the presence of sulfuric acid, whereupon the reaction mass is permitted to stratify, then the lower layer is taken off as waste acid; the top layer is then treated with sulfuric acid and oleum.

Still more particularly this invention relates to an improvement upon our copending application #295,256. Therein it was proposed to prepare phenolic derivatives by reacting long chain olefines, preferably with a range of from 8 to 20 carbon atoms, with mono-alkylated phenols, in which the alkyl side chain has not less than 4 carbon atoms. These poly-alkyl phenols when treated with sulfuric acid (concentrated) are rendered water-soluble in the acid and neutral state and display in aqueous solution remarkable wetting, emulsifying and detergent properties.

It will be seen that the preparation of surface active agents of this type according to the procedure set out in our copending application, however, requires the employment of several diverse steps.

It is an object of the present invention to prepare poly-alkylated phenols from mono-alkylated phenols followed by the sulfonation of the poly-alkylated phenols without their isolation as such.

A still further object is to prepare these water soluble phenolic sulfonates from olefines and mono-alkylated phenols, without the separation of the intermediate polyalkylated phenols as such.

The objects are attained according to the herein described invention which broadly comprises reacting mono-alkylated phenols with long chain olefines in the presence of sulfuric acid which enters into the reaction, said acid being present in greater than catalytic proportions; there is thereby produced water soluble surface-active phenolic sulfonic acids. The olefines are employed in substantially molecular proportions. The proportion and method of addition of the sulfuric acid may be varied. The preferred embodiment is to use from one to four moles of sulfuric acid per mole of the phenol, and to add the sulfuric acid either in one stage or in two stages. In either case, however, the sulfuric acid is present during the alkylation in greater than catalytic amounts.

It can be readily understood that such procedure has a number of advantages as follows:

1. It makes vacuum distillation superfluous and, consequently, eliminates the necessity of costly equipment.

2. It eliminates recovery of unreacted materials and the consequent mechanical losses involved in such recovery.

3. The time required to obtain the products in their final water-soluble state is considerably reduced from the time required for the separate preparation of the high molecular weight phenolic bodies obtained according to our copending application, and their subsequent reaction with sulfuric acid.

The compounds prepared in this direct and simple way explained herein have identical properties, such as solubility in water and wetting-out power, with the sulfonated products obtained in the manner described in the copending application of ours referred to supra.

By the term "olefines" in this method we refer to unsaturated hydrocarbons consisting entirely or primarily of a long straight chain. Olefines which are particularly useful in the reactions are those having one double bond, preferably ranging from 8 carbon atoms to 20 carbon atoms in length, such as diisobutylene, diamylene, dodecylene, and hexadecylene. Mono-alkyl phenols which are adapted for the preparation of these compounds are those which have alkyl groups ranging in length from 4 to 6 carbon atoms, such as para tertiary butyl phenol, ortho amyl phenol, and para amyl phenol. It is to be understood that any of these above mentioned unsaturated hydrocarbons can be reacted with any of the above mentioned mono-alkylated phenols. Mixtures can, of course, be used.

We have found, furthermore, that instead of the above-mentioned olefines which may be either present as such, whether pure or commercial grade, or prepared in situ, we could employ long chain fatty alcohols directly by first heating them together with alkyl phenols in the presence of sulfuric acid at moderate temperatures and, subsequently, raising the temperature. The reaction is performed in such a way that the alcohols are first converted, presumably into olefines, and combination is then effected with the alkyl phenols. Products are obtained having properties similar to those possessed by materials prepared from olefines and alkyl phenols and sulphonated.

The following examples serve to illustrate the invention, but they are not intended to limit it thereto it is to be understood.

Example 1

41 grams of commercial ortho amyl phenol are mixed with 42 grams of dodecylene and cooled to 10° C. With vigorous agitation, 25 grams of 96% sulfuric acid are added dropwise while the temperature of the reactants is kept between 8° C. and 12° C.

The resulting oil is stirred for an additional 1½ hours while the temperature is kept between 10° C. and 15° C., after which the oil is allowed to stand at room temperature for approximately 24 hours.

To the resulting oil is then added, dropwise and with stirring, 30 grams of sulfuric acid monohydrate, while the temperature is kept between 7° C. and 10° C. The resulting oil is then stirred and warmed gradually to about 70° C. during a period of about two hours. A thick red oil which is water-soluble and possessed of excellent foaming characteristics results.

The oil is cooled to about 40° C. and neutralized with sodium hydroxide in a known manner. After evaporation to dryness, 145 grams of a hard, tough, sticky mass remains. A 10% solution of this material in water is soapy, opalescent, and strongly foaming.

Example 2

11 grams of commercial cetyl alcohol are dissolved in 8.5 grams of commercial ortho amyl phenol and brought to a temperature of 45° C.

20 grams of sulfuric acid monohydrate are then added dropwise and with stirring while the temperature of the reactants is kept between 45° C. and 55° C. The temperature is then raised to 80° C. and maintained with stirring at this point for about 1½ hours.

The resulting viscous oil is poured into 300 grams of ice and water and neutralized with commercial 45% potassium hydroxide liquor. The neutral material is evaporated to dryness over a water bath and yields 38 grams of a cream-colored coarse powder. Dilute aqueous solutions of the resulting product are foamy, and possessed of good wetting and detergent properties.

Example 3

85 grams of commercial para tertiary butyl phenol are mixed with 60 grams of commercial diisobutylene. To this mixture, with stirring, there is added dropwise 50 grams of 96% sulfuric acid while the temperature is kept at about 10° C. The resulting product is stirred for several hours at room temperature and then allowed to set at room temperature for about 24 hours.

The resulting material is transferred to a separatory funnel and the lower layer is removed. The upper layer is poured into 200 c. c. of water and neutralized with sodium hydroxide in the known manner, after which the solution is evaporated to dryness over a water bath. 190 grams of a soft cream-colored paste is obtained. This paste dissolves very readily in water to yield foamy solutions.

The foregoing examples, it is understood are representative only of the practice of the invention. This method may be subjected to variations and modifications without departing from the spirit and scope of applicants' invention, which is not limited to the specific embodiments except as defined in the appended claims.

What we particularly point out and distinctly claim as our invention is:

1. In the process of preparing water soluble sulfuric acid derivatives of poly-alkylated phenols, the step of reacting an olefine containing 7 to 20 carbon atoms with mono-alkyl phenols containing a side chain of 4–6 carbon atoms and in the presence of concentrated sulfuric acid in the ratio of 1–4 moles of the acid per mole of the phenol.

2. In the process of preparing water soluble sulfuric acid derivatives of poly-alkylated phenols, the step of reacting an olefine containing 7 to 20 carbon atoms with mono-alkyl phenols containing a side chain of 4–6 carbon atoms and in the presence of concentrated sulfuric acid which is employed in greater than catalytic proportions whereby sulfonation results and which is added in two stages.

3. In the process of preparing water-soluble poly-alkylated phenolic sulfonic derivatives, the step of reacting alcohols containing 7 to 20 carbon atoms with mono-alkyl phenols containing a side chain of 4–6 carbon atoms and in the presence of concentrated sulfuric acid which is employed in greater than catalytic proportions whereby sulfonation results.

4. The water-soluble surface active sulfonated derivative of a poly-alkylated phenol wherein one alkyl group has a length of between 4 and 6 carbon atoms and another alkyl group has a length of between 7 and 20 carbon atoms.

5. In the process of preparing water soluble poly-alkylated phenolic sulfonic acid derivatives, the step of reacting an alkylating compound from the group consisting of olefines and alcohols containing 7 to 20 carbon atoms with mono-alkyl phenols containing a side chain of 4–6 carbon atoms and in the presence of concentrated sulfuric acid which is employed in greater than catalytic proportions whereby sulfonation results.

6. In the process of preparing water soluble sulfuric acid derivatives of poly-alkylated phenols, the step of reacting amyl phenol with dodecylene and in the presence of concentrated sulfuric acid which is employed in greater than catalytic proportions whereby sulfonation results and which is added in two stages.

7. In the process of preparing water soluble sulfuric acid derivatives of poly-alkylated phenols the step of reacting diisobutylene with butyl phenol and in the presence of concentrated sulfuric acid employed in greater than catalytic proportions of the acid whereby sulfonation results.

8. In the process of preparing water soluble poly-alkylated phenolic sulfonic derivatives, the step of reacting cetyl alcohol with amyl phenol and in the presence of concentrated sulfuric acid which is employed in greater than catalytic proportions whereby sulfonation results.

MARK WEISBERG.
PRESTON G. SLACHMAN.